(12) United States Patent
Crook et al.

(10) Patent No.: US 6,212,739 B1
(45) Date of Patent: Apr. 10, 2001

(54) EXPANDABLE PINTLE WIRES

(76) Inventors: Robert L. Crook, 4614 Pinehurst Rd., Wilson, NC (US) 27896; Ian Christison Sayers, 30 Chester Brook, Ribchester, Lanes (GB), PR3 3X7

( * ) Notice: Subject to any disclaimer, the term of this patent is extended or adjusted under 35 U.S.C. 154(b) by 0 days.

(21) Appl. No.: 09/284,943

(22) PCT Filed: Oct. 14, 1997

(86) PCT No.: PCT/GB97/02813

§ 371 Date: Jun. 24, 1999

§ 102(e) Date: Jun. 24, 1999

(87) PCT Pub. No.: WO98/19077

PCT Pub. Date: May 7, 1998

(30) Foreign Application Priority Data

Oct. 26, 1996 (GB) .................................................. 9622302

(51) Int. Cl.[7] .................................................... F16G 3/02
(52) U.S. Cl. .................. 24/33 P; 24/33 C; 24/33 B; 24/33 R
(58) Field of Search ................... 24/33 P, 33 B, 24/33 C, 33 R

(56) References Cited

U.S. PATENT DOCUMENTS

| 4,381,612 | 5/1983 | Shank | 34/116 |
|---|---|---|---|
| 4,500,590 | 2/1985 | Smith | 428/222 |
| 4,551,378 | 11/1985 | Carey, Jr. | 428/198 |
| 4,863,786 * | 9/1989 | Green et al. | 428/234 |
| 5,049,425 | 9/1991 | Essele | 428/36.1 |
| 5,079,807 * | 1/1992 | Hood | 24/33 P |
| 5,169,570 * | 12/1992 | Sayers et al. | 264/22 |
| 5,503,195 | 4/1996 | Edens, Jr. | 139/383 AA |
| 5,514,438 * | 5/1996 | Crook, Jr. | 24/33 P |

FOREIGN PATENT DOCUMENTS

| 0 405 034 | 1/1991 | (EP) . |
|---|---|---|
| 0 445 708 | 9/1991 | (EP) . |
| 0 529 506 | 3/1993 | (EP) . |
| 0 695 827 | 2/1996 | (EP) . |
| 2 032 483 | 5/1980 | (GB) . |

* cited by examiner

Primary Examiner—Victor N. Sakran
(74) Attorney, Agent, or Firm—Caesar, Rivise, Bernstein, Cohen & Pokotilow, Ltd.

(57) ABSTRACT

A pintle wire (10) for insertion through interdigitating end loops of a belt fabric or of a spiral connector, is disclosed which is expandable after insertion into the seam, for example by way of a sheath (12) which includes a thermally activated expanding agent. This is subject to heating to expand the sheath (12), causing the pintle wire (10) to swell and fill voids in the seam area reducing permeability in the seam and thus reducing marking of paper webs carried by the belt.

32 Claims, 1 Drawing Sheet

EXPANDABLE PINTLE WIRES

BACKGROUND OF THE INVENTION

FIELD OF THE INVENTION

This invention relates to pintle wires, used for joining the ends of belts to form endless fabrics, for example in paper machine clothing, particularly press felts, by being passed through interdigitated loops from each of the respective ends.

The loops, which may be for example integral yarns from the base structure fabric, or in the form of a helical coil, sewn or integrated into the base structure of the belt or in the form of interlocking molded parts woven, cast or bonded into the base structure are provided on each end of the belt, so that the loops of the coil can be interdigitated, and substantially aligned for passage of the pintle wire through the interdigitated loops. Problems frequently occur with undesirable marking of the paper web, in the area where it is supported by the belt over the region where the belt ends abut and are joined by the seam comprised by the loops and pintle wire. A common cause of this marking is the fact that the belt has a much greater permeability in the seam region than elsewhere, leading to a variation in drainage.

SUMMARY OF THE INVENTION

The pintle wire itself may be a monofilament, multifilament of spun yarn, or a combination of one or more of these to form a twisted, cabled, plied or braided yarn which may optionally contain filler fibres. The pintle wire material is typically a synthetic polymer, although natural materials or minerals may be used, or even a combination of two or more of these materials. The pintle wire may be stiffened by treatment with resin or combination with a metal wire.

An object of this invention is to provide an embodiment of pintle wire for a seam whose tendency to mark a paper web carried on a paper machine clothing belt is substantially reduced.

According to the invention, a pintle wire includes or consists of at least one strand or filament of a material which can be expanded by physical or chemical means after introduction of said pintle wire to join a respective end seam.

A pintle wire according to the invention may be a monofilament, multifilament or spun yarn, or a combination of one or more of these to form a twisted, cabled, plied or braided yarn which may optionally contain filler fibres at least one of the yarn, filament, of fibre components being expandable after introduction of the pintle wire into the belt seam formed by the interdigitated loops.

The expandable component may be an intumescent yarn which swells under the influence of heat, typically comprising at least one core yarn encapsulated in a resin containing a foaming agent. This core yarn is preferably a multifilament due to the greater surface area creating better adhesion between the resin and the resin coating, although a twisted, cabled, braided or plied yarn, or even a monofilament, may be used. Alternatively there may be no core yarn, the component being wholly of a synthetic material including a foaming agent.

The expandable component may contain foaming agents which are thermally activated, or the trigger for the foaming reaction of such agents may be a source other than heat, for example a chemical reaction brought about by contact with water.

Other possible forms of expandable components include pre-stretched yarns, which increase in diameter after the release of longitudinal tension, and absorbent fibres, which take up water (by means for example of a superabsorbent or hydrophilic coating or fibrous sheath on a core filament) and thereby increase in girth. Natural fibres such as cotton or wool may used for this purpose.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiments of the invention will now be described by way of example with reference to the accompanying drawings, wherein:

DESCRIPTION OF THE INVENTION

Figure 1:
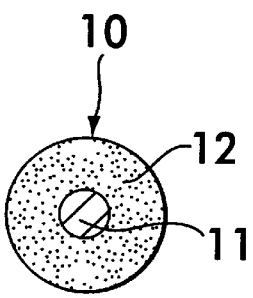
FIG. 1 is a cross-section of a front embodiment of pintle wire according to the inventions.

In FIG. 1 a pintle wire generally designated by the numberal 10 comprises a monofilament comprising a core 11 of a suitable synthetic material, and a sheath 12 of a material including a thermally activated blowing agent, which is preferably one which produces nitrogen gas due to its non-oxidative properties. The material of the sheath 12 is partially or fully cured at a temperature below the temperature at which the blowing agent is activated.

Figure 2A:
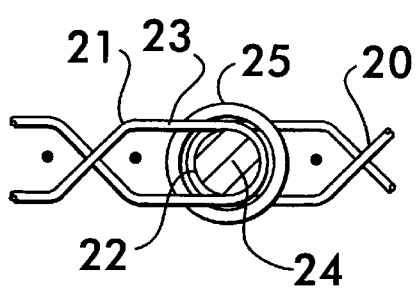
FIG. 2a is a sectional view of the end seam of FIG. 2.
Figure 2:
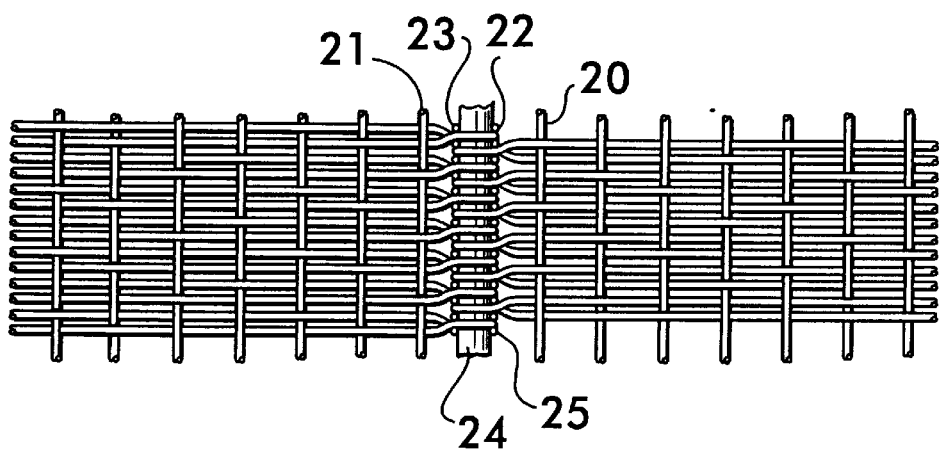
FIG. 2 and is a schematic plan view of a pintle wire, in situ after threading through opposing belt and loops, and after expansion.

After the pintle wire is threaded through interdigitated loops of a pair of opposed belt ends, the pintle wire 10 is briefly exposed to an elevated temperature, eg. by means of hot air or an infra-red heater, and the sheath 12 is expanded. The result is illustrated in FIGS. 2 and 2a. Here, opposed belt ends 20,21 carry loops respectively 22,23, formed for example by extension of longitudinal warp threads of the belt. A pintle wire 24 is passed through the loops 22,23 and then expanded. The expanded pintle wire 24 bulges through the gaps between adjacent loops 22,23 and forms protrusions 25 which fill out voids in the seam area, thereby reducing permeability in this area to reduce the tendency of the paper web to be marked by the seam.

Figure 3:
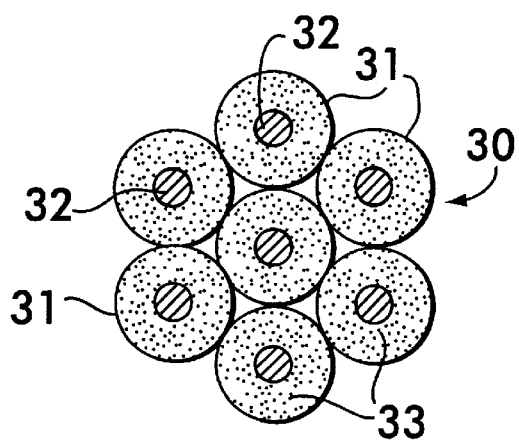
FIG. 3 is an alternative pintle wire according to the invention.

In FIG. 3 is shown an alternative pintle wire generally designated by the numberal 30, comprising a plurality of monofilament yarns 31, which are twisted or braided together. Such yarn 31 has a core 32 and a sheath 33, similar to the sheath 12 of the rod 11 of FIG. 1. The sheaths are expandable under the same conditions as the sheath 12, so that the pintle wire 30 can also expand, and take the place of pintle wire 24 of FIGS. 2 and 2a.

Figure 4:
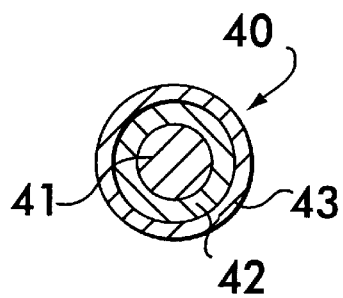
FIG. 4 is a cross-sectional view of a third embodiment of pintle wire according to the invention.

FIG. 4 shows a pintle wire generally designated by the numeral 40 which takes the form of a cable, with a core of one or more monofilaments 41, an inner sheath 42 and an outer sheath 43. The filament(s) 41 extend longitudinally, whilst the sheaths 42 and 43 comprise fibres wound about the core 41, the fibres of inner sheath 42 preferably being wound in the opposite direction to those in the outer sheath 43. The fibres of the sheaths and/or the core filaments include a blowing agent which is thermally activated as in FIG. 1 to produce the effect as illustrated in FIGS. 2 and 2a.

The yarns used may have a mono or multi-filament core, which is of any organic or inorganic polymer normally used for pintle wires, such as polyester, such as PET, PTT, PBT, PBN or PER, co-polymer such as PCTA, polyolefin e.g. PE, PP, Dyneema (trademark) or Spectra (trademark), nylon eg. nylon 6, nylon 6.6, nylon 6.10, nylon 6.12 or nylon 12, aramids eg. Kevlar (trademark) or Twaron (trademark), PBO, PEEK, polyketone, PPS, PPO, rayon, glass, metal or natural substances or any combination of one or more of these materials, either in the form of polymer blends or as a combination of their fibres and/or yarns. Low cost materials such as polyester, nylon or rayon are preferred. A ferromagnetic filament may be incorporated into the core so that induction heating can be used to actuate the foaming agent.

A further embodiments of expandable pintle wire according to the invention, not illustrated in the drawings, is made by extruding a yarn from pellets of a thermoplastic polymer (e.g. an aliphatic or partially aromatic polyamide) that contain m- or p-aramid fibres, and then coating the yarn with a sheath of a water-sensitive polymer such as PVA or PEBAX (Trade name). The sheath is exposed to water at the appropriate time to cause the yarn to increase in diameter by as much as 50%.

The coating material should have a good abrasion resistance and may be provided with abrasion resistant particles or beads of eg. glass, ceramic, metal (which if ferromagnetic can help induction hearing) or ormocer, or even other polymers, such as polyurethane. A contamination release finish such as fluoropolymer or ormocer may be provided over the coating and/or may be incorporated into the coating material. This coating material may also contain phosphorescent, luminescent, fluorescent or iridescent material to assist threading the wire in poor light conditions. Other standard ingredients for coating materials such as fillers, pigments or processing aids may also be present.

The actual coating material used may be a viscous plastisol such as PVC, comprising eg 50–60% wt PVC resin and 40–50% wt plasticisers and other additives. These give excellent expansion and are cheap materials, but due to environmental considerations relatively low melting point thermoplastics such as polyolefin, polyurethane, or TPU may be used. Hot-melts such as copolyesters and copolyamides may also be used.

The coated yarns may be flattened, eg. by calendering, for use in spiral seams, in which case the core yarn preferably has little or no twist in order for the pintle wire to retain a flat configuration. Ideally the yarn expands to approximately double its diameter.

After insertion of the pintle wire, the yarns are typically exposed to temperatures of 80°–200° C. for 3–8 seconds, depending on the heat resistance of the other materials in the seam. This heating may be carried out using hot air or an infra-red heater. Where temperature sensitive materials are present, induction heating of the pintle wire containing ferromagnetic particles and/or filaments is preferred.

A typical blowing agent is AZOCEL, a trade-name of Fairmount Chemical Co. for an azodicarbonamide which decomposes at 150–200° C.; or Kemapore 125, which is also an azodicarbonamide by Stepan Chemical Co. The blowing agent is added in up to 15% wt, of the coating, 0.2–5% wt being the preferred range.

If a core is surrounded by more than one coating, the blowing agent is preferably concentrated in the outermost coating. The coated yarns are prepared by standard co-extrusion or coating techniques or coating eg. as described in GB 2032483, and are preferably coated under tension to prevent shrinkage during foaming.

Non-thermally activated blowing agents may be used, such as a synthetic high molecular weight polymer, sodium carbonate, citric acid mixture, and a polycarbonate processing acid additive. (Hoechst, EP 0445708). This material will foam upon contact with water. Another such material is Hynol, by W. R. Grace, which is a foamable hydrophilic polyurethane pre-polymer derived from toluene diisocyanate which reacts at room temperature with compounds containing active hydrogen atoms, including water and alcohol, to form elastomeric foams. Curing times range from 3–6 minutes, which can be accelerated by incorporating a catalyst into the material.

Other possible means of obtaining an expandable pintle wire include biocomponent wires, using the differential shrinkage of biocomponent yarns, such as in U.S. Pat. No. 4,551,378 or EP 529506; pre-stretched yarns which increase in diameter on relaxation, and absorbent or hydrophilic yarns such as OASIS (trademark), a fibre produced by Technical Absorbent's, which swell on contact with water.

In an alternative embodiment, the seam forming loops may contain at least one expandable component as disclosed above, instead of or as well as the pintle wire.

The invention being thus described it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A seam construction in a papermachine fabric, said seam construction comprising:
    a pintle wire having at least one strand of a material, said material being expanded by at least one of a physical means and a chemical means, after introduction of said pintle wire into said seam construction for joining a respective end seam.

2. A pintle wire in a seam construction according to claim 1, comprising a monofilament yarn.

3. A pintle wire according to claim 2, wherein the expandable component is an intumescent yarn which swells under the influence of an outside stimulus.

4. A pintle wire according to claim 3, wherein said intumescent yarn comprises at least one core yarn encapsulated in a sheath of resin containing a foaming agent.

5. A pintle wire according to claim 4, wherein said core yarn is a multifilament.

6. A pintle wire according to claim 3, wherein the intumescent yarn is wholly of a synthetic material including a foaming agent.

7. A pintle wire according to claim 3, wherein said outside stimulus is heat, the foaming agent being heat actuated.

8. A pintle wire according to claim 7, wherein a ferromagnetic filament is incorporated into the core of the expandable yarn so that induction heating can activate the foaming agent.

9. A pintle wire according to claim 3, wherein said outside stimulus is contact of the foaming agent with water.

10. A pintle wire according to claim 2, wherein the said yarn has a good abrasion resistance, being provided with abrasion resistance particles or beads incorporated in the sheath.

11. A pintle wire according to claim 2, wherein the wire includes a phosphorescent, luminescent or fluorescent material to assist in threading the wire in poor light conditions.

12. A pintle wire according to claim 2, wherein the wire is flattened by calendering.

13. A pintle wire according to claim 2, wherein said filament has a good abrasion resistance, and being provided with abrasion resistance beads incorporated in the sheath.

14. A pintle wire in a seam construction according to claim 1, comprising a multifilament yarn.

15. A pintle wire in a seam construction according to claim 1, comprising a spun yarn.

16. A pintle wire in a seam construction according to claim 1, comprising a twisted cabled, plied or braided yarn, at least one or some of the strands from which the yarns is formed being expandable.

17. A pintle wire in a seam construction according to claim 1, wherein said expandable strand comprises of at least one pre-stretched yarns which increase in diameter after the release of longitudinal tension.

18. A pintle wire in a seam construction according to claim 1, wherein said expandable strand comprises at least one yarn which take up water, and thereby increase in girth.

19. A pintle wire according to claim 18 wherein said expandable strand consists of one of the following a superabsorbent, hydrophilic coating, and fibrous sheath on a core filament.

20. A pintle wire in a seam construction according to claim 1, wherein said expandable strand is provided by a bi-component wire with differential shrinkage between the components, which causes the diameter of the strand to increase due to such shrinkage.

21. An expandable pintle wire in a seam construction according to claim 1 which has a sheath of a water-sensitive-polymer, which swells on exposure to water.

22. A pintle wire according to claim 21, formed by extruding a yarn from pellets of thermoplastic polymer and coating the yarn with the sheath of said water-sensitive polymer.

23. A pintle wire according to claim 22, wherein said water-sensitive polymer is PVA, and said thermoplastic polymer comprises an aliphatic aromatic polyamide, and the pellets contain p-aramid fibres.

24. A pintle wire in a seam construction according to claim 1, wherein said expandable filament comprises of at least one pre-stretched yarn which increases in diameter after the release of longitudinal tension.

25. A pintle wire in a seam construction according to claim 1, wherein said filament comprises of at least one fibre which takes up water, and thereby increases in girth.

26. A pintle wire according to claim 25, wherein said expandable filament consists of at least one of the following a superabsorbent, hydrophilic coating and fibrous sheath on a core filament.

27. A pintle wire in a seam construction according to claim 1, wherein said expandable filament is provided by a bi-component wire with differential shrinkage between the components, which causes the diameter of the strand to increase due to such shrinkage.

28. An expandable pintle wire in a seam construction according to claim 1 which has a sheath of a water-sensitive polymer, which swells on exposure to water.

29. A pintle wire according to claim 28, formed by extruding a yarn from pellets of thermoplastic polymer and coating the yarn with the sheath of said water-sensitive polymer.

30. A pintle wire according to claim 29, wherein said water-sensitive polymer is PEBAX (Trade name), and said thermoplastic polymer comprises a partially aromatic polyamide, and the pellets contain m-aramid fibres.

31. A seam construction in a seam area of a papermachine fabric, said seam construction being formed by two ends coming together, each said two ends having at least one loop and being opposing interdigitized loops, said seam construction comprising:

a pintle wire for joining said ends of said seam construction, said pintle wire having a core and at least one sheath surrounding said core and being passed through each of said opposing interdigitized loops of said ends positioned in said seam construction; and at least one of said core and said sheaths being formed of expandable material and being expanded by an outside stimulus to form protrusions on said pintle wire, said protrusion bulging through gaps between said opposing interdigitized loops for filling voids in the seam area of said seam construction.

32. A seam construction in a papermachine fabric, said seam construction comprising:

a pintle wire having at least one filament of a material, said material being expandable by an outside stimulus consisting of at least one of a physical means and a chemical means after introduction of said pintle wire to join a respective end seam.

\* \* \* \* \*